US008260490B2

(12) United States Patent
Regnard De Lagny et al.

(10) Patent No.: US 8,260,490 B2
(45) Date of Patent: Sep. 4, 2012

(54) METHOD FOR IMPROVING DIAGNOSIS OF A POSSIBLE BREAKDOWN IN A VEHICLE

(75) Inventors: Joseph Regnard De Lagny, La Norville (FR); Abdelmalik Belaid, Paris (FR)

(73) Assignee: Renault s.a.s., Boulogne-Billancourt (FR)

( * ) Notice: Subject to any disclaimer, the term of this patent is extended or adjusted under 35 U.S.C. 154(b) by 848 days.

(21) Appl. No.: 12/088,942

(22) PCT Filed: Sep. 28, 2006

(86) PCT No.: PCT/FR2006/050957
§ 371 (c)(1),
(2), (4) Date: Jul. 30, 2008

(87) PCT Pub. No.: WO2007/042695
PCT Pub. Date: Apr. 19, 2007

(65) Prior Publication Data
US 2009/0055042 A1 Feb. 26, 2009

(30) Foreign Application Priority Data
Oct. 3, 2005 (FR) ..................................... 05 10073

(51) Int. Cl.
*G01M 17/00* (2006.01)

(52) U.S. Cl. ..................................... 701/32.5; 701/31.4

(58) Field of Classification Search .................... 701/29, 701/29.1, 31.4, 31.6, 31.7, 32.5, 33.4, 33.6
See application file for complete search history.

(56) References Cited

U.S. PATENT DOCUMENTS

| | | | | |
|---|---|---|---|---|
| 5,737,711 | A | 4/1998 | Abe et al. | |
| 5,890,080 | A * | 3/1999 | Coverdill et al. | 701/29 |
| 5,950,147 | A * | 9/1999 | Sarangapani et al. | 702/179 |
| 6,310,542 | B1 | 10/2001 | Gehlot | |
| 6,343,236 | B1 | 1/2002 | Gibson et al. | |
| 6,363,304 | B1 * | 3/2002 | Ramsey | 701/35 |
| 6,676,841 | B2 * | 1/2004 | Akins et al. | 210/744 |
| 6,993,675 | B2 * | 1/2006 | Roddy et al. | 714/2 |
| 7,647,145 | B2 * | 1/2010 | Eickhoff et al. | 701/29 |
| 7,865,278 | B2 * | 1/2011 | Underdal et al. | 701/29 |
| 2003/0095038 | A1 * | 5/2003 | Dix | 340/425.5 |
| 2007/0088465 | A1 * | 4/2007 | Heffington | 701/1 |

FOREIGN PATENT DOCUMENTS

EP 1 164 551 12/2001

* cited by examiner

*Primary Examiner* — Darnell Jayne
*Assistant Examiner* — Stanton L Krycinski
(74) *Attorney, Agent, or Firm* — Oblon, Spivak, McClelland, Maier & Neustadt, L.L.P.

(57) ABSTRACT

A method for diagnosing a possible breakdown of a vehicle component. The method stores a first distance covered by the vehicle at a time when an event related to the breakdown occurs, and stores at least another covered distance, and then makes the diagnosis based on the stored covered distances.

7 Claims, 1 Drawing Sheet

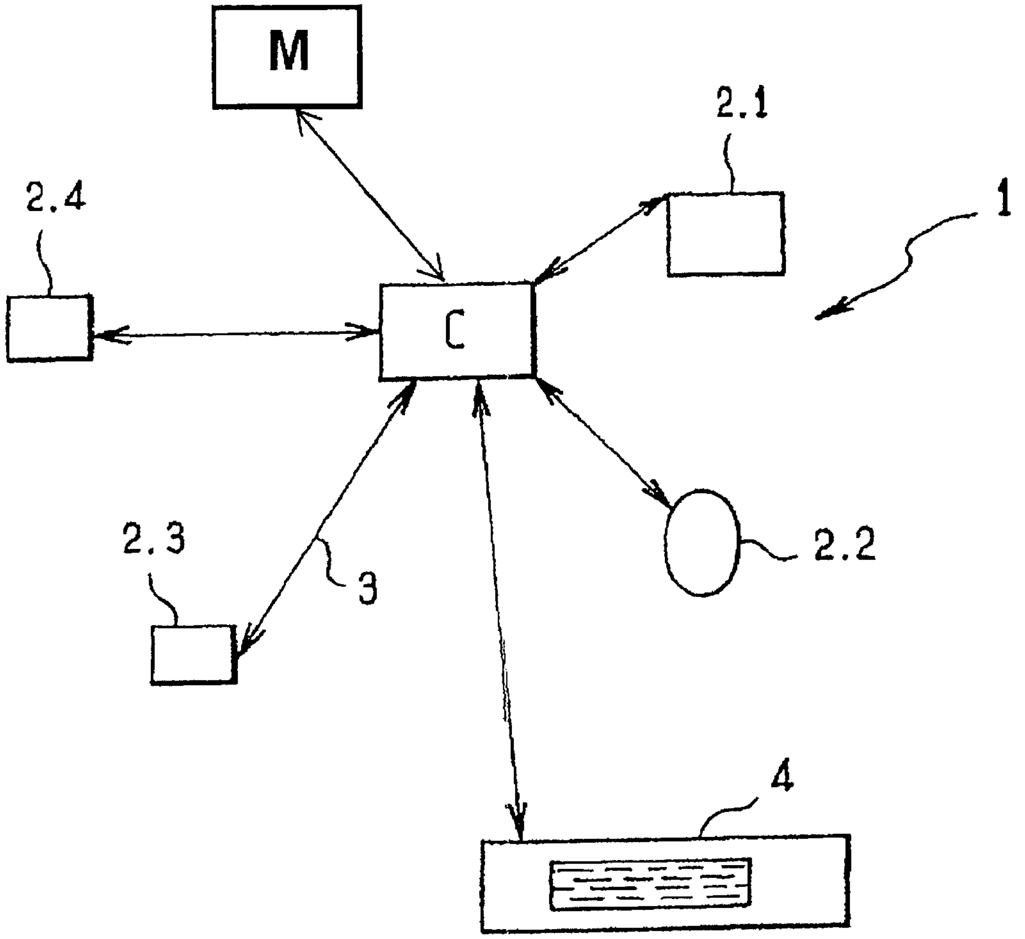
M
2.1
2.4
1
C
2.3
2.2
3
4

METHOD FOR IMPROVING DIAGNOSIS OF A POSSIBLE BREAKDOWN IN A VEHICLE

BACKGROUND

The present invention relates to the diagnostics used for revealing possible component faults in a vehicle, particularly a motor vehicle.

In particular, the invention relates to a method for diagnosing a possible fault of a component of a vehicle comprising a step of storing a distance traveled by the vehicle at a time when an event associated with the fault occurs.

In the case of motor vehicles in particular, the engines are conventionally provided with computers making it possible to help with management of the components.

As an example, the computer may control an injection system, an automatic gearbox, etc.

It is also known that such a computer may also be used in the context of the aforementioned diagnosis.

It will be noted as a preliminary that usually a diagnosis made by the vehicle is called an onboard diagnosis.

In particular this involves running tests based in particular on measurements and detecting possible defective operation of components during the routine use of the vehicle.

Onboard diagnosis usually differs from offboard diagnosis, which, in a known manner, is carried out by the repairer, preferably after having analyzed the onboard diagnosis, if necessary with the aid of a diagnostic aid device.

In particular this involves the repairer taking a decision on the strategy to adopt on the subject of a possible repair.

Generally, when a fault in the vehicle appears for the first time, the computer commands the recording of this event in a nonvolatile memory.

Usually, the event is associated in the memory with a code identifying the fault.

Therefore, on reading this memory, the diagnosis method is capable of recognizing the faulty component in the whole vehicle.

In the light of this diagnosis, if the danger that the fault represents for the vehicle and/or the passengers is great, the computer may if necessary command an emergency action (for example displaying a request for an emergency stop).

On the other hand, if the fault represents a slight danger, the computer does not usually initiate any action that is perceptible by the user until a garage repairman, analyzing the onboard diagnosis, identifies the fault and then repairs the component (offboard diagnosis).

One problem associated with this method is that the information given by the onboard diagnosis, the fault code in this instance, is relatively poor, which limits the quality of the offboard diagnosis and therefore the possibilities of action and/or reaction.

As an example, the onboard diagnosis is not able to differentiate between a permanent and an intermittent fault, that is to say that appears and then disappears at least once.

Consequently, such an information defect may limit the diagnosis of the repairer (offboard diagnosis) and therefore adversely affect the efficacy of his work.

In order to remedy these disadvantages, there is a known method in which the distance traveled at the time when the first event takes place is stored in addition to the fault code.

It will be noted here that in everyday language, the distance traveled corresponds to the mileage of the vehicle.

According to this method, it is possible to store the absolute mileage, or else the total mileage, that is to say the mileage read when the fault appears.

It may also store the relative mileage, namely the mileage read since said appearance.

In this respect, it is nowadays increasingly simple to obtain the absolute mileage of the vehicle.

Specifically, the computers of modern systems for monitoring a drive train usually use as a datum the instantaneous speed of the vehicle and reconstitute the absolute mileage by means of a time integration of this speed.

Having the absolute or relative mileage in the memory offers the advantage of increasing the quantity of information relating to the fault since the user also has a time-stamp of the appearance of this fault.

Although it has been of assistance on many occasions, such a method nevertheless remains limited.

In particular, the stored information is still insufficient when the user, as is increasingly the case, desires to enhance the quality of the diagnoses.

As an example, it may be of value to assess whether a fault that has finally disappeared has or could still cause other faults in the vehicle.

But, as will be understood, the method using the aforementioned simple time-stamp, and more generally the methods of the prior art, do not make it possible to generate any diagnosis on this subject.

BRIEF SUMMARY

One object of the invention is to remedy at least the aforementioned disadvantages.

To this end, according to the invention, a method is proposed for diagnosing a fault of a component of a vehicle, characterized in that it comprises a first step of storing a first distance traveled by the vehicle at a time when an event associated with the fault occurs, and a second step in which:

- at least one other distance traveled is stored, then
- the diagnosis is made based on the stored distances traveled.

Preferred, but nonlimiting, aspects of the method according to the invention are as follows:

- at least one of the distances stored is an absolute distance;
- at least one of the distances stored is a relative distance;
- said other distance is stored at a time when another event associated with the fault occurs;
- said other event is selected from the following group:
- disappearance of the fault,
- reappearance of the fault although it had disappeared;
- said other distance stored corresponds to a computation of the total distance traveled in the presence of the fault;
- the fault is diagnosed as having repaired itself if the total distance traveled in the presence of the fault is less than a predetermined threshold;
- a code is stored making it possible to identify the fault, in addition to said other distance traveled.

A further proposal of the invention is a computer for a vehicle comprising an instruction set for diagnosing a possible fault of a component of a vehicle, the instruction set being adapted so that a first distance traveled by the vehicle can be stored at a time when an event associated with the fault of the component occurs, characterized in that the instruction set is also adapted so that another distance traveled is stored, and in order to subsequently make the diagnosis based on the stored distances traveled.

A further proposal is an engine comprising such a computer and a diagnostic aid system consisting of the engine and a diagnostic aid device external to this engine.

BRIEF DESCRIPTION OF THE DRAWINGS

Other aspects, objects and advantages of the invention will better emerge on reading the following description of the invention, made with reference to the appended drawing in which FIG. 1 illustrates an engine 1 of the invention comprising a computer C interacting with a memory M and other components that sooner or later are to be diagnosed.

DETAILED DESCRIPTION

As a preliminary, it is understood here that a diagnosis according to the invention is on the one hand a diagnosis made by a repairer or a diagnostic aid device usually temporarily connected to the vehicle, and on the other hand a diagnosis made by the vehicle itself.

Therefore, according to the invention, the term diagnosis means without distinction an onboard and offboard diagnosis.

FIG. 1 represents an engine 1 according to the invention.

The engine comprises a computer C which interchanges information with a memory M.

Furthermore, the computer interacts with other components of the engine indicated, particularly by reference numbers 2.1 to 2.4, so that a diagnosis according to the invention can be made.

Reference number 2.1 represents for example a fuel injection system while reference number 2.2 is a gearbox.

The engine also interchanges information with a diagnostic aid device 4 forming an interchange interface with the repairer.

The device comprises, in a nonlimiting manner, a screen on which the repairer can ascertain the diagnosis generated directly by the engine.

But the device may also itself contribute to the generation of the diagnosis, particularly by analyzing information supplied by the vehicle.

Naturally, the engine of the invention is in no way limited to the representation that is made thereof in this figure.

In particular, the connecting lines ending in arrows may indicate in a general manner an interchange of information between the components pointed to at the ends of these arrows.

In this case, these interchanges may be made in different ways known per se.

As a nonlimiting example, the connection 3 may represent an interchange via wire between the computer and the component 2.3 or else a wireless connection.

In either case, the connection 3 is provided by means of other components of the engine not shown in the figure (for example a wireless communication interface, etc.).

The computer comprises an instruction set capable of applying the method according to the invention.

The method makes it possible to diagnose a possible fault of one or more components, such as the components 2.1-4, by storing in the memory M a distance traveled by the vehicle at a time when the fault occurs.

This first distance, which may be relative or absolute, forms a first time-stamp of the event in question.

In order to link this distance specifically to the faulty component, an identification code of the latter may also be stored in the memory.

Naturally, other storage techniques may also be used.

For example, the faulty component may be identified by using directly the indices of a matrix in which all the distances of the faulty components are recorded.

In every case, the user is always capable of subsequently finding the stored distance of an identified faulty component.

According to the invention, another distance traveled by the vehicle is stored.

According to one aspect of the invention, said other distance is stored at a time when another event associated with a fault occurs.

In this case, the computer uses an additional time-stamp of the fault so as to provide additional information useful to the diagnosis.

As a nonlimiting example, if the fault disappears of its own accord, that is to say without the intervention of a repairer, the distance traveled by the vehicle at the time when this event takes place is also recorded in the memory.

More precisely, this will occur every time an event of the type selected from the following group occurs:

disappearance of the fault, reappearance of the fault although it had disappeared.

The diagnosis is then enhanced in particular because it is possible to establish various repair strategies depending on the values of all the stored distances traveled associated with the fault.

Depending on the case, these repair strategies may be handled by the vehicle, particularly the computer, by the repairer, or even by both.

According to one aspect of the invention, it is considered that the fault has repaired itself if it has not been evident for a mileage greater than a predetermined threshold value.

This particular diagnosis is based notably on the principle that, if a fault has not been evident for a considerable mileage, it is reasonable to consider that it has repaired itself.

For example, this may correspond to a case in which the component had become dirty so that it malfunctioned, and the dust has finally disappeared.

In another case, it could involve a transient stoppage of the component.

According to a variant, if the fault has not been evident for a mileage greater than the predetermined threshold value, it is considered that the fault is repaired because a user or a repairer without a diagnostic aid device has himself repaired the component.

In this case, the repairer furnished with the diagnostic aid device can simply erase the event associated with the fault in question from the memory.

According to another aspect of the invention, the total distance traveled in the presence of the fault is computed and stored.

For this purpose, the memory contains all the distances stored when this fault appeared and disappeared.

It is therefore easy to deduce therefrom said total distance traveled by an evident application of operations of the addition and subtraction type.

It is then considered that, if the computed distance is less than a predetermined threshold, the repairer does not have to concern himself with the effects that the fault may have had on the rest of the vehicle.

It will be noted that such a diagnosis may be established by the repairer after having ascertained the total distance stored in memory.

This diagnosis may also be handled by the computer or the diagnostic aid device, which are arranged so that the repairer is informed, typically via the screen, of the action to take (in this instance in this example: "do not be concerned with the effects that the fault may have had on the rest of the vehicle").

A nonlimiting example illustrating such a situation is as follows.

Consider a vehicle having a controlled ignition engine in which misfires have occurred intermittently over a short total distance, that is to say less than the aforementioned threshold.

It is then sufficient to repair only the cause of this fault.

If, on the other hand, the total distance traveled is considerable (greater than said threshold), it will be appropriate, in addition to repairing the component in question, to ensure by known methods that the vehicle's exhaust gas catalytic processing system is operating correctly.

Accordingly, the method of the invention may advantageously comprise a step in which the repairer is informed of the other components to be diagnosed or already diagnosed for example by the computer.

Naturally, the present invention is in no way limited to the embodiment described above and represented in the drawings.

Other information may supplement that mentioned above.

In particular, those skilled in the art will understand that the method may in particular store a fault occurrence number or any other datum making it possible to increase the information and enhance the quality of the diagnosis.

The invention claimed is:

1. A method for diagnosing a possible fault of a component of a vehicle including a computer and a memory, comprising:

storing in the memory a first distance traveled by the vehicle and a code to identify the fault at a time when an event associated with the fault occurs;

after the storing the first distance and when the computer determines that the fault has repaired itself, storing in the memory a second distance traveled, the second distance being a total distance traveled at a time when the computer determines that the fault has repaired itself; and making a diagnosis, using the computer, based on the stored distances traveled.

2. The method as claimed in claim 1, wherein at least one of the stored distances is an absolute distance.

3. The method as claimed in claim 1, wherein at least one of the stored distances is a relative distance.

4. The method as claimed in claim 1, wherein the fault is diagnosed as having repaired itself if the total distance traveled in the presence of the fault is less than a predetermined threshold.

5. A computer for a vehicle comprising a microprocessor coupled to a memory wherein the microprocessor is programmed to execute the following instruction set for diagnosing a possible fault of a component of a vehicle:

storing a first distance traveled by the vehicle and a code to identify the fault in the memory at a time when an event associated with the fault of the component occurs, after the storing the first distance and when the computer determines that the fault has repaired itself, storing a second distance traveled in the memory, the second distance being a total distance traveled at a time when the computer determines that the fault has repaired itself, and making the diagnosis based on the stored distances traveled.

6. An engine, comprising:

a computer including an instruction set to make a diagnosis of a possible fault of a component of a vehicle; and a memory configured to store distances traveled by the vehicle, wherein the memory is configured to store a first distance traveled by the vehicle and a code to identify the fault at a time when an event associated with the fault of the component occurs, after the first distance is stored and when the computer determines that the fault has repaired itself, the memory is configured to store a second distance traveled, the second distance being a total distance traveled at a time when the computer determines that the fault has repaired itself, and the computer is configured to subsequently make the diagnosis based on the stored distances traveled.

7. A diagnostic aid system, comprising:

the engine as claimed in claim 6; and a diagnostic aid device external to the engine, the diagnostic aid device including a display screen to display the diagnosis made by the computer.

* * * * *